March 2, 1943.  F. KING  2,312,419

TENSIOMETER

Filed Oct. 2, 1940

INVENTOR
Franklin King

BY
ATTORNEYS

Patented Mar. 2, 1943

2,312,419

UNITED STATES PATENT OFFICE 2,312,419

TENSIOMETER

Franklin King, Narrows, Va., assignor to Celanese Corporation of America, a corporation of Delaware Application October 2, 1940, Serial No. 359,325

1 Claim. (Cl. 265—1.6)

This invention relates to tension measuring devices, and relates more particularly to devices for measuring the tension in running yarns, threads, filaments or the like.

It is often desirable in textile operations to ascertain the tension in running yarns, threads, filaments or the like but, owing to the large and rapidly occurring fluctuations in the tension, instruments heretofore employed for indicating the tension on a scale or dial were very unsatisfactory in that the oscillations of the pointer were such that only an approximation of the tension could be read. Moreover, it was impossible by their use to obtain anything but the barest approximation of the average tension over a period of time.

It is accordingly an important object of this invention to provide a tension measuring device which is free from the foregoing and other disadvantages and which is especially simple in construction and efficient in operation.

Another object of this invention is the provision of a tension measuring device having means therein for positioning the same on a textile machine to prevent the tilting of the measuring device or the holding of it out of line, whereby errors are substantially avoided.

A further object of this invention is the provision in a tension measuring device of means for adjusting the main spring.

Other objects of this invention, together with certain details of construction and combinations of parts, will appear from the following detailed description.

Referring to the accompanying drawing wherein one embodiment of my invention is shown, Figure 1 is a perspective view of the device of my invention;

Like characters of reference indicate like parts throughout the several views of the drawing.

Figure 1:
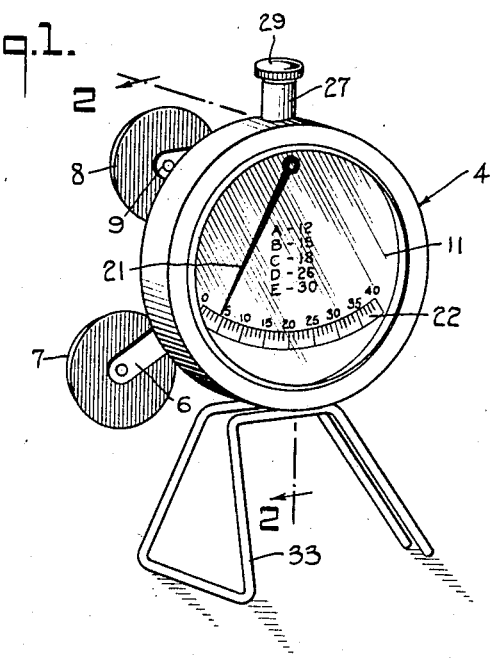
Figure 2:
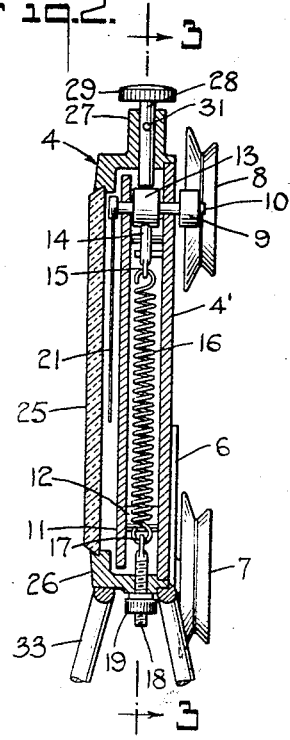
Figure 2 is a cross-sectional view taken on line 2—2 in Figure 1.
Figure 3:
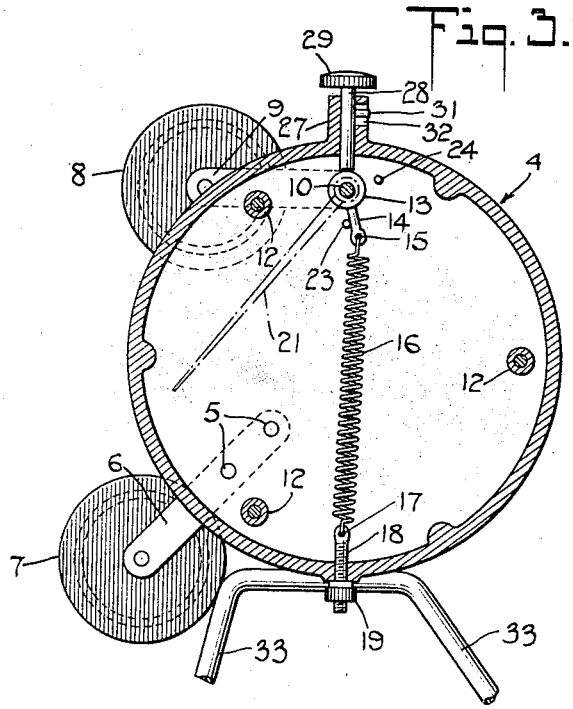
Figure 3 is a cross-sectional view taken on line 3—3 in Figure 2.

In the drawing, the reference numeral 4 indicates generally the casing of my tension measuring device, which casing has substantially the same size and shape as a pocket-watch casing. The rear wall 4' of the casing 4 has fixed thereto, as by means of rivets 5, an arm 6 on the free end of which is rotatably carried a pulley 7. In line with the pulley 7 is a second pulley 8 rotatably carried at one end of an arm 9, the other end of which is fixed to a shaft 10 pivotally mounted in the rear wall 4' of the casing and in the dial 11 attached to said rear wall by means of bolts or rivets 12.

The shaft 10 is provided with an enlarged portion or boss 13 substantially midway between the ends thereof. A lever arm 14 is attached to said boss 13, the free end of said lever arm having an eyelet 15 adapted to receive one end of a coil spring 16. The other or lower end of the spring 16 is hooked in an eyelet 17 of a screwthreaded member 18 which extends through a suitable opening in casing 4 and has thereon a knurled nut 19. This knurled nut 19 and threaded member 18 provide a means for adjusting the tension on spring 16.

Shaft 10 also has fixed thereto a pointer 21 adapted to be moved over scale 22 on dial 11 by movement of pulley 8 as will hereinafter be described. Pins 23 and 24 are provided to limit the movement of the lever arm 14 and thus the swing of pointer 21. A transparent member 25 closes the opening in the front member 26 of the casing 4.

If desired each tensiometer can be calibrated against a standard and a scale reading such as A, B, C, etc., marked opposite the actual coded grams tension required. In effect this would mean that a calibration correction would appear on each instrument. Thus, each calibrated instrument would have the letters A, B, C, D and E along the scale 22 but not necessarily at the same numerical reading. Thus, C in one tensiometer might be at 19, at 17 on another and at 18 on still another. In practice, all tensions on a certain group of coners which are to go in a certain type of yarn would be set for the same absolute tension by being set, for example, for C tension on all tensiometers regardless of whether the numerical reading on all tensiometers was the same.

Since the tension in the running yarns, threads, filaments, or the like is subject to large and rapidly occurring fluctuations, the tension measuring device of this invention is provided with means for dampening such fluctuations to permit an accurate reading of the tension to be made. To this end, the stem 27 integral with casing 4 has extending therethrough a key or plunger 28 having a knurled head 29. The lower end of the key or plunger is adapted to be pressed against boss 13 on the shaft 10. A light pressure on head 29 by a finger will dampen the fluctuations of the pointer and permit a reading to be made. To prevent the key or plunger 28 from falling out of the stem, a pin 31 is fixed on said key or plunger and extends into an opening 32 in the stem.

The tension measuring device is provided with legs 33 suitably fixed thereto, which legs may be inserted in suitable slots or holes provided therefor or existing in the textile machine on which the tension of the running yarns, threads or filaments is being ascertained.

In operation the device is placed in a suitable position on the textile machine where the tension of the yarn, thread or filament is being ascertained in suitable slots or holes for receiving the legs of the measuring device. The yarn, thread or filament is then threaded over pulley 8 and under pulley 7. The tension of the yarn, thread or filament causes pulley 8 to be depressed thereby moving pointer 21 across the scale 22 on the face of dial 11. To obtain a fairly accurate reading the rapid fluctuations of pointer 21 are dampened by lightly pressing head 29 which causes key or plunger 28 to press against the boss 13, the frictional contact slowing down the fluctuations of the pointer.

It is to be understood that the foregoing detailed description is given merely by way of illustration and that many variations may be made therein without departing from the spirit of my invention.

Having described my invention, what I desire to secure by Letters Patent is:

A device for measuring the tension in running yarns, threads, filaments or the like, comprising a casing, a shaft mounted in said casing, a boss on said shaft, a lever arm fixed to said boss, a contractile spring attached to said lever arm and said casing, means for adjusting the load on said spring, a pointer mounted on said shaft for pivotal movement in said casing and a pair of pulleys adapted to engage said running yarns, threads or filaments, one of said pulleys being fixed to said casing and the other of said pulleys being operatively connected to said pointer, the construction and arrangement being such that the tension in the yarns, threads or filaments causes the pulley operatively connected to the pointer to be depressed whereby the pointer is moved against the action of said contractile spring to indicate the amount of tension in said yarns, threads or filaments and means for dampening the movement of said pointer, said means including a plunger adapted to be pressed against said boss.

FRANKLIN KING.